Jan. 9, 1934.  F. W. EUE  1,942,750
PLANT SUPPORT
Filed July 11, 1932
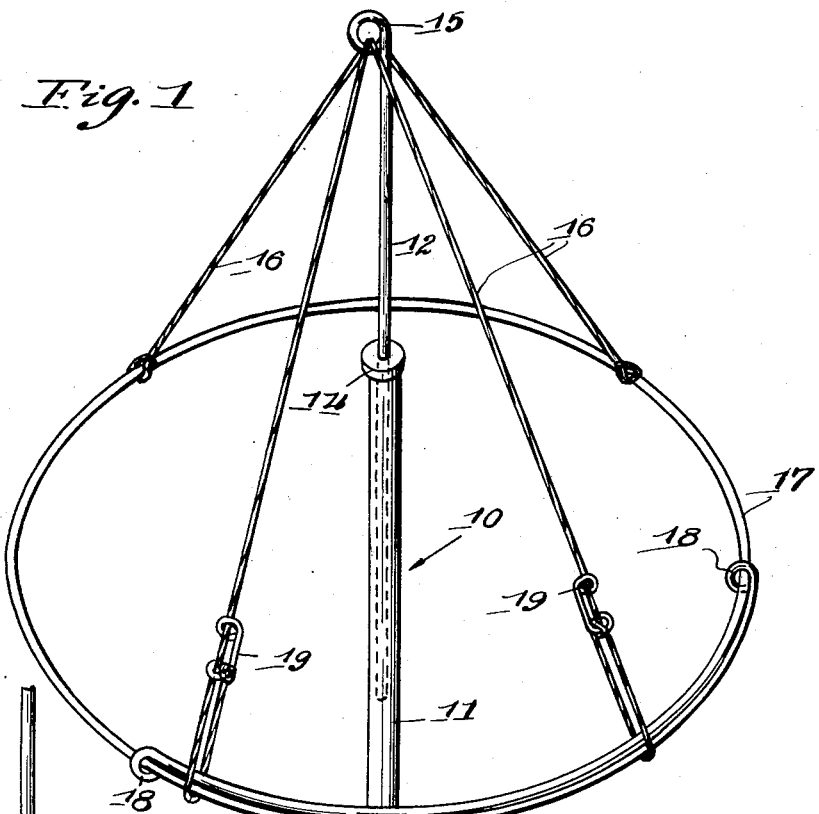
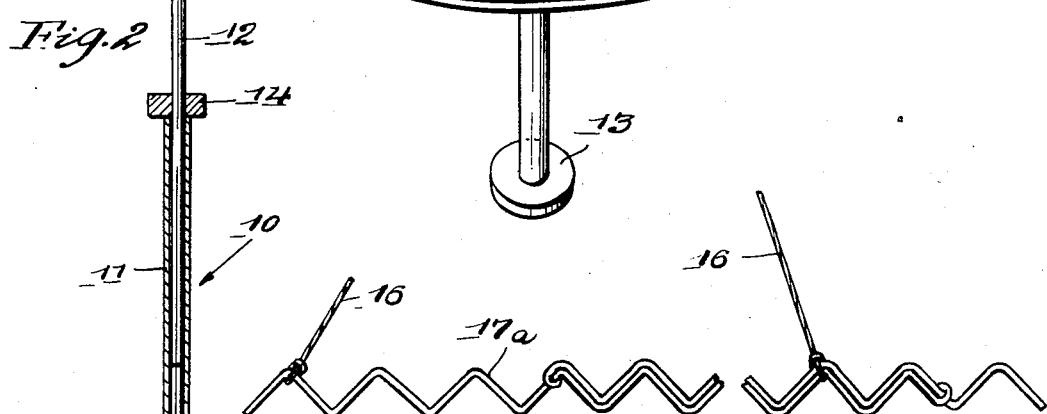
Inventor
Frederick W. Eue
By Stryker & Stryker
Attorney

Patented Jan. 9, 1934

1,942,750

UNITED STATES PATENT OFFICE 1,942,750

PLANT SUPPORT

Frederick W. Eue, St. Paul, Minn.

Application July 11, 1932. Serial No. 621,898

3 Claims. (Cl. 47—47)

My invention relates to plant supports.

The object of my invention is to provide a support for plants which will not injure the roots or interfere with cultivation.

A further object is to provide a support adjustable to plants of different sizes, both as to height and circumference.

A further object is to provide, for ornamental plants, efficient and inconspicuous protection against injury by rain, wind and the tools used in cultivation.

In the accompanying drawing Figure 1 is a perspective view of my improved plant support; Fig. 2 is a vertical section of the leg or standard supporting the device, and Fig. 3 is a fragmentary view of an alternate form of the adjustable ring adapted to encircle the plant.

Referring to the drawing, the centrally arranged leg or standard 10 consists of a tube 11 adapted to receive the vertically sliding rod 12. The base of the standard is provided with a shoe or plate 13 adapted to rest upon the ground in the center of the plant or cluster of plants to be supported and protect the roots from injury. A friction disk 14 engages the rod 12 at the top of the tube 11 so as to permit said rod to be raised or lowered within the tube and to hold the rod when extended in adjusted position as to height. The top of the rod 12 is formed with a loop 15 adapted to freely receive the hereinafter described cords 16, by which the ring 17 is suspended. This ring is made of a wire of considerably greater length than the circumference of the ring when in use and eyes 18 are formed in the ends of the wire to encircle the body or the ring 17. Thus the ring may be enlarged or contracted manually, the resiliency of the wire holding the eyes 18 in the desired adjusted position. This construction of the ring 17 not only permits adjustment thereof on plants of different diameter, but facilitates the placing of the ring about the plant by allowing the expansion of the ring to embrace all of the branches of a plant without breaking them and then, when the ring is contracted, to hold the said branches in position. This ring 17 is suspended from the central standard by two cords 16 which pass through the loop 15. One end of each cord is tied to the ring and the other end is looped about the opposite side of the ring and is attached to a sliding buckle 19 through which the cord passes to permit adjustment of the length of the cords to suit the requirements of the plant to which the support is applied.

Instead of making the ring of plain wire, as shown in Fig. 1, it may be made of crimped wire, as shown at 17a in Fig. 3. This form, while more expensive and less flexible than the plain wire, is stronger and permits more rigid adjustment of the ring as to size and also permits a more symmetrical arrangement of the branches of the supported plant.

To conveniently place the plant support in position, the rod 12 is depressed in the tube 11 and the ring 17 is expanded to its largest diameter. The disk 13 is then placed in the center of the plant and the branches thereof drawn within the ring, after which the ring may be contracted by sliding the eyes 18 on the body of the wire 17 and the ring may be raised to desired position by extending the rod 12 upwardly and further adjustment can be secured by sliding the buckles 19 on the body of the cords 16 to hold the branches at the desired height.

It has been found that a plant support of the kind described can be most successfully used with ornamental plants such as peonies and delphiniums. Plants of this class, while symmetrical and upright under favorable conditions are, if unsupported, subject to great damage in case of storms and heavy rains. An inconspicuous support is desirable but to drive a stake in the center of the plant seriously injures its roots and a support provided with a plurality of legs prevents necessary cultivation. My support permits cultivation, does not damage the root and is at the same time an efficient and sufficiently rigid support for the plant. When in use, it is inconspicuous and if of green or neutral color is practically concealed by the plant.

Having described my invention, what I claim as new and desire to protect by Letters Patent is:

1. A support for a plant having roots located near the surface of the ground comprising, a standard having a blunt base adapted to rest on the surface of the ground above said roots without substantial penetration, a substantially horizontally disposed ring adapted to encircle the plant and to afford a common rest for the peripheral shoots, stalks or branches thereof and flexible means supporting said ring on said standard, said standard being freely tiltable and being retained in substantially upright position solely by said flexible means and ring in engagement with the plant.

2. A support for a plant having roots located near the surface of the ground comprising, a standard having a blunt base adapted to rest on the ground above said roots without substantial penetration, an expansible ring adapted to encircle the plant and flexible means freely suspending said ring from said standard, said standard being freely tiltable and being retained in substantially upright position solely by said flexible means and ring in engagement with the plant.

3. A support for a plant having roots located near the surface of the ground comprising, a blunt base adapted to rest on the ground above said roots without substantial penetration, a standard supported on said base and having relatively movable upper and lower sections, means for securing said upper section in adjusted positions relative to said lower section, a substantially horizontal ring adapted to encircle the plant and to afford a rest for a multiplicity of the outer branches, shoots or stalks of the plant and flexible means supporting said ring on said upper section of said standard, said base and standard being freely tiltable and being retained in substantially upright position solely by said flexible means and ring in engagement with the plant.

FREDERICK W. EUE.